Jan. 25, 1938. J. HOFMANN 2,106,428

DIATHERMIC APPARATUS WITH QUENCHED SPARK GAP

Filed Feb. 21, 1933

Inventor:
Josef Hofmann
by Edward H. Palmer
atty.

Patented Jan. 25, 1938

2,106,428

UNITED STATES PATENT OFFICE 2,106,428

DIATHERMIC APPARATUS WITH QUENCHED SPARK-GAP

Josef Hofmann, Berlin-Reinickendorf-Ost, Germany, assignor to Elektricitätsgesellschaft "Sanitas", Berlin, Germany, a corporation of Germany Application February 21, 1933, Serial No. 657,793
In Germany February 25, 1932

8 Claims. (Cl. 128—422)

This invention relates to diathermic apparatus and more particularly to short or ultra-short wave diathermic apparatus comprising a quenched spark-gap.

The invention and its aims and objects will be readily understood from the following description, taken in connection with the accompanying drawing of several embodiments of the invention herein given for illustrative purposes, the true scope of the invention being more particularly pointed out in the appended claims.

Short wave and ultra short wave diathermy as heretofore practiced with tube apparatus is very disadvantageous because the efficiency of the tubes is very low so that large tubes must be used if the output is to be in some measure sufficient. In view of the high cost of tubes and their relatively rapid deterioration through use, this is a serious objection from a commercial point of view which has effectively hindered the expansion of short wave diathermy. In addition the undamped oscillations of tube apparatus are difficult to control or adjust, as the slightest change in the treating circuit produces an out of tune condition.

Diathermic apparatus with damped oscillations are free from the above objections, and attempts have therefore been made to build such apparatus for short waves. Heretofore, however, it has invariably been found that short wave diathermic apparatus with spark-gaps are not efficient enough, that is to say do not deliver the output required in practice, one objection being that as the capacity in the oscillatory circuit is diminished, the operation of the spark-gap becomes more and more irregular, until, with a very low capacity, spark production ceases entirely and arcing occurs. It is true that in long wave diathermy a quiet regular operation of the spark gap has been secured by providing an auxiliary circuit comprising a capacity and self-induction, in parallel with the spark-gap. If such an expedient be adopted in the case of short wave diathermic apparatus however, the result is that the greater part of the energy flows over the auxiliary circuit and the apparatus is practically lacking in efficiency, its output being practically nil.

The present invention overcomes all these objections, the result being the production of short wave diathermic apparatus with spark-gap, the efficiency and output of which are at least equal to those of tube apparatus.

I have found by experiment that by increasing the self-induction of the auxiliary circuit, the efficiency and output of the apparatus are increased. In accordance with my invention, therefore, I increase said self-induction as much as possible, but not to the point that the condenser or so-called quenching capacity in parallel with the spark-gap becomes inoperative or substantially so, as this would result in arcing at the spark-gap. In accordance with my invention I also provide regulating or adjusting means for said self-induction (see Fig. 2) whereby the efficiency or output of the apparatus can be regulated or adjusted, diminishing said self-induction increasing the energy flowing through the auxiliary circuit and therefore decreasing the output or efficiency of the apparatus, and vice versa, and this without any change or variation being effected in the oscillatory or treating circuit so that the same wave length is retained.

Figure 1:
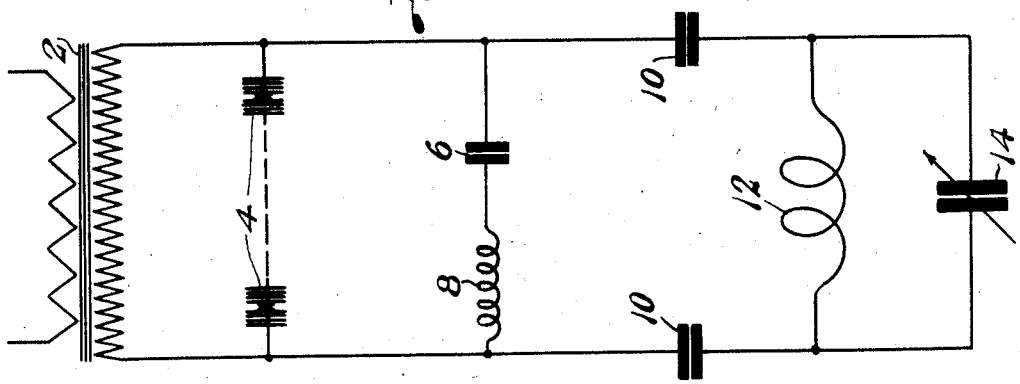
Fig. 1 is a diagrammatic illustration of one illustrative embodiment of the invention.

Referring to Fig. 1, there is therein diagrammatically represented a low frequency transformer 2, a series spark-gap 4, a capacity 6 and self-induction 8 in an auxiliary circuit, a capacity 10 and self-induction 12 in an oscillatory circuit, and a variable or adjustable treatment capacity 14. Said capacity 6 and self-induction 8 may be of any suitable kind; the said capacity may for example comprise three series connected mica condensers having a total capacity of approximately 5,000 sq. cm. and said self-induction may comprise a coil of a coil-diameter of about 160 mm. While said capacity 10 of the oscillatory circuit may be of any suitable kind, it herein preferably amounts to 25 sq. cm., and the self-induction of said circuit herein preferably comprises seven windings of a 9 mm. tube with a coil-diameter of about 120 mm.

Figure 2:
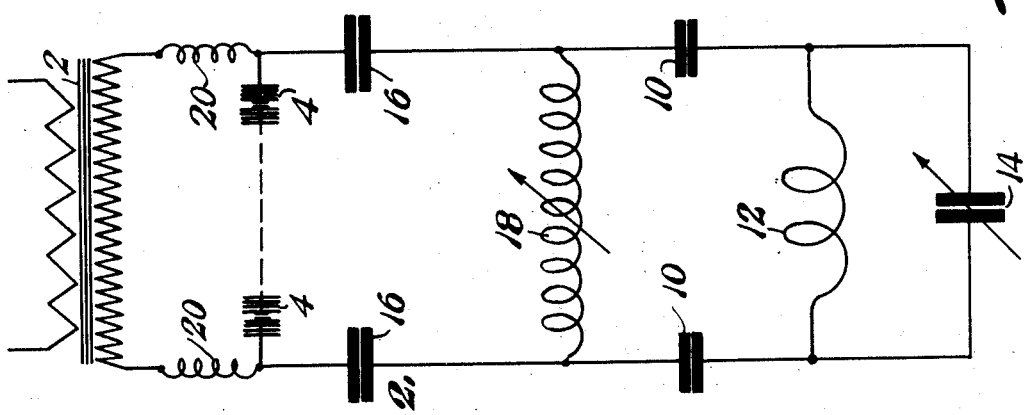
Fig. 2 shows diagrammatically another illustrative embodiment of the invention in which the auxiliary circuit comprises a large capacity, and showing also choking means intermediate the spark-gap and the transformer.

The same results are obtained by the embodiment diagrammatically represented in Fig. 2, wherein the auxiliary circuit includes a large capacity 16 of 20,000 sq. cm. for example, and an adjustable self-induction 18 of a coil-diameter of 240 mm. and 250 windings on a winding length of 190 mm. In this embodiment of the invention 10 is the capacity and 12 the self-induction of the oscillatory circuit which may be of the same size as those of Fig. 1. The large capacity 16 is without influence upon the rapid oscillations. In this figure a transformer is shown at 2, a series spark-gap at 4 and a variable or adjustable treating capacity at 14.

Means will preferably be provided between the spark-gap and the transformer to prevent the rapid oscillations from flowing off to earth. Any suitable means may be provided for this purpose, such as choke coils 20 for example as shown in Fig. 2 or stop-circuits for example.

Figure 3:
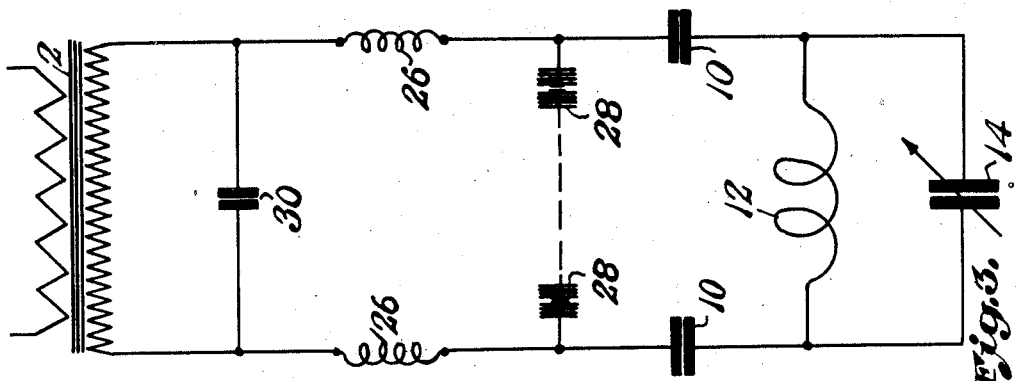
Fig. 3 shows diagrammatically a further illustrative embodiment of the invention, in which the self induction of the auxiliary circuit also acts as choking means to prevent the rapid oscillations from escaping into the earth.

In the illustrative embodiment of the invention diagrammatically shown in Fig. 3, the self-induction of the auxiliary circuit is inserted, in the form of two coils 26, 26, in the conductors connecting the transformer 2 and the spark-gap 28, said self-induction thus fulfilling not only its normal function but also acting to prevent the rapid oscillations from escaping to earth, by replacing the choke coils or other devices used in the other embodiments shown. The capacity of the auxiliary circuit is shown at 30, the capacity and self-induction of the oscillatory circuit at 10 and 12 and a variable or adjustable treating capacity at 14.

It will be observed that by making the self-induction of an auxiliary circuit 1 parallel to the spark-gap as large as possible, yet not so large as to prevent the capacity from functioning sufficiently to preclude arcing at the spark-gap, a quiet, regular operation of said spark-gap is secured. The apparatus embodying my invention is exceedingly reliable and efficient.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

I claim:

1. Diathermic apparatus for generating short or ultra-short waves comprising, in combination, an oscillatory circuit including a condenser of relatively small capacity and a quenched spark-gap; an auxiliary circuit in parallel to said spark gap, said auxiliary circuit comprising a condenser of relatively large capacity compared to that of said first-named condenser; a self-induction preceding said condenser in said auxiliary circuit; and a treatment capacity connected to said oscillatory circuit.

2. Diathermic apparatus for generating short or ultra-short waves comprising, in combination, an oscillatory circuit including a condenser of relatively small capacity and a quenched spark-gap; an auxiliary circuit in parallel to said spark gap; a condenser of relatively large capacity compared to that of said first-named condenser, in said auxiliary circuit; an adjustable self-induction preceding said condenser in said auxiliary circuit; and a treatment capacity connected to said oscillatory circuit.

3. Diathermic apparatus for generating short or ultra-short waves comprising, in combination, an oscillatory circuit including a condenser of relatively small capacity and a quenched spark-gap; an auxiliary circuit in parallel with said spark-gap and including a condenser of relatively large capacity compared to that of said first-named condenser, and a self-induction preceding said condenser in said auxiliary circuit; and a treatment circuit coupled with said auxiliary circuit.

4. Diathermic apparatus for generating short or ultra-short waves comprising, in combination, a transformer; a short wave oscillatory circuit including a condenser of relatively small capacity and a quenched spark-gap; conductors connecting said transformer and said spark-gap; an auxiliary circuit in parallel with said spark-gap, said auxiliary circuit comprising a condenser and self-induction means, said condenser being of relatively large capacity compared to that of said first-named condenser, and said self-induction means being inserted in said conductors and thus acting to prevent escape of high frequency oscillations to earth as well as forming the auxiliary circuit in combination with said condenser in the latter; and means for supplying electrodes with short wave oscillations from said short wave oscillatory circuit.

5. Diathermic apparatus for generating short or ultra-short waves comprising, in combination, an oscillatory circuit including a condenser of relatively small capacity and a quenched spark-gap; an auxiliary circuit in parallel with said spark-gap and including a condenser and self-induction, said self-induction preceding said condenser in said auxiliary circuit, and the capacity of said condenser in said auxiliary circuit being relatively large compared to that of said condenser in said oscillatory circuit; and a variable treating capacity connected with said oscillatory circuit.

6. Diathermic apparatus for generating short or ultra-short waves comprising, in combination, a short wave oscillatory circuit including a quenched spark-gap for partial sparking; an auxiliary circuit including a quenching condenser in parallel with said spark-gap, high frequency choking means preceding said quenching condenser in said auxiliary circuit; and means for supplying electrodes with short wave oscillations from said short wave oscillatory circuit.

7. Diathermic apparatus for generating short or ultra-short waves comprising, in combination, a short wave oscillatory circuit including a condenser and a quenched spark-gap for partial sparking; an auxiliary circuit including a quenching condenser in parallel with said spark-gap; high frequency choking means preceding said quenching condenser in said auxiliary circuit, the capacity of said quenching condenser being greater than that of said condenser in said oscillatory circuit; and means for supplying electrodes with short wave oscillations from said short wave oscillatory circuit.

8. Diathermic apparatus for generating short or ultra-short waves comprising, in combination, a short wave oscillatory circuit including a condenser and a quenched spark-gap for partial sparking; and an auxiliary circuit including a quenching condenser in parallel with said spark-gap; high frequency choking means preceding said quenching condenser in said auxiliary circuit, the capacity of said quenching condenser being a multiple of that of said condenser in said oscillatory circuit; and means for supplying electrodes with short wave oscillations from said short wave oscillatory circuit.

JOSEF HOFMANN.